Sept. 19, 1944.  E. G. ZEEB  2,358,486

VEHICLE FRONT END CONSTRUCTION

Filed Aug. 5, 1941  2 Sheets-Sheet 1

INVENTOR
Elmer G. Zeeb.
BY Harness, Lind, Palee & Harris
ATTORNEYS.

Sept. 19, 1944.  E. G. ZEEB  2,358,486
VEHICLE FRONT END CONSTRUCTION
Filed Aug. 5, 1941  2 Sheets-Sheet 2
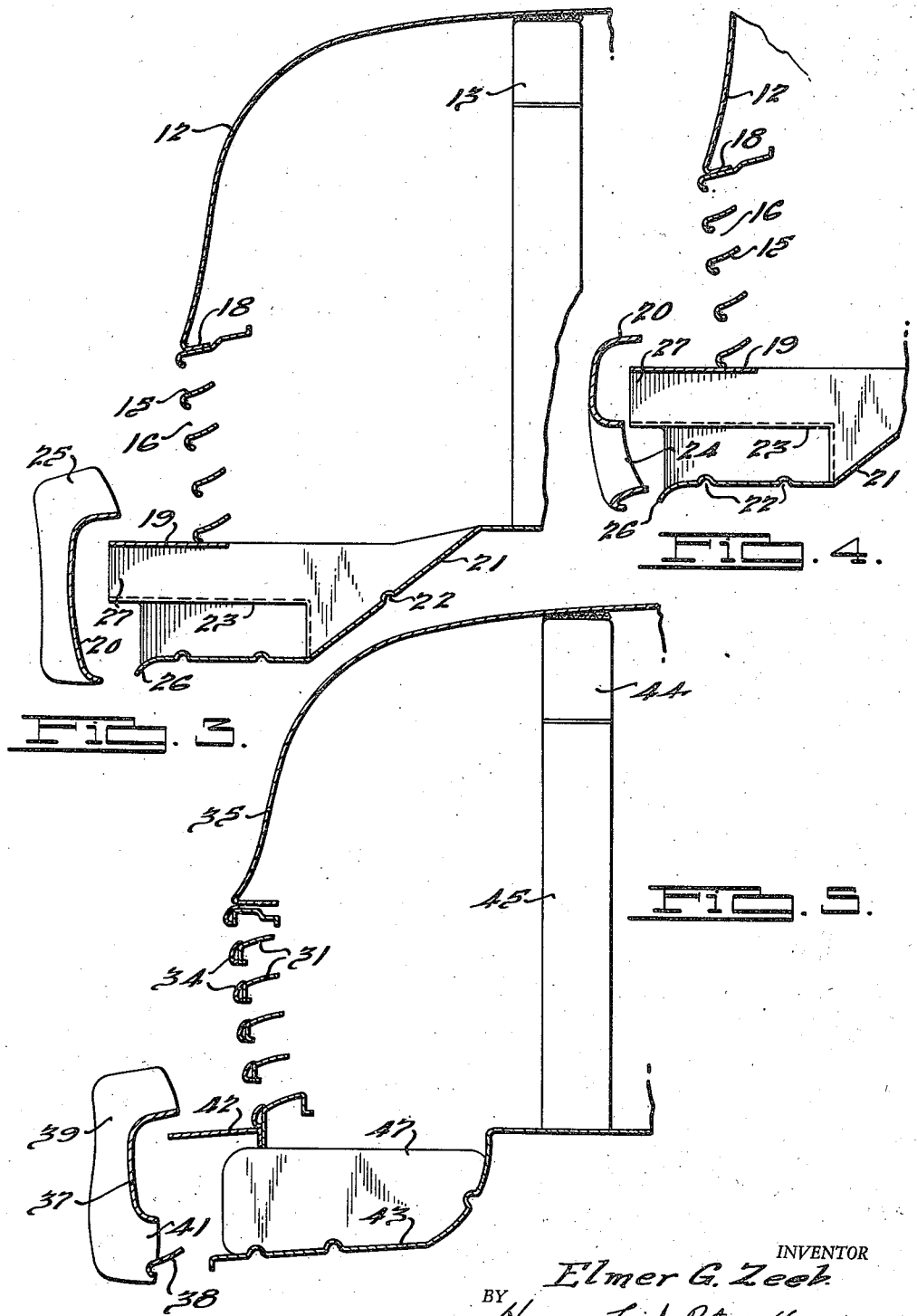
INVENTOR
*Elmer G. Zeeb.*
BY *Harness, Lind, Patee & Harris*
ATTORNEYS.

Patented Sept. 19, 1944

2,358,486

UNITED STATES PATENT OFFICE 2,358,486

VEHICLE FRONT END CONSTRUCTION

Elmer G. Zeeb, Grosse Pointe Woods, Mich., assignor to Chrysler Corporation, Highland Park, Mich., a corporation of Delaware Application August 5, 1941, Serial No. 405,526

7 Claims. (Cl. 293—55)

The present invention relates to vehicle front end construction and particularly to an improved construction for admitting and directing cooling air to the vehicle radiator.

During recent years the trend in automobile front end design has been toward improved appearance with considerable sacrifice in air intake facilities. From the appearance standpoint, it is becoming increasingly desirable to present a solid looking front end with no or at best slight suggestion of radiator or cooling openings.

In the improved front end construction described herein, pleasing appearance without sacrifice of cooling efficiency is obtained. A portion of the air for cooling the radiator is admitted through or beneath the bumper and a scoop is provided for directing the air thus admitted to the radiator core.

Two embodiments of the invention are shown herein for illustrative purposes. In the accompanying drawings, Fig. 1 is a partial cut-away perspective view of the front end of a vehicle embodying the invention.

Figure 2:
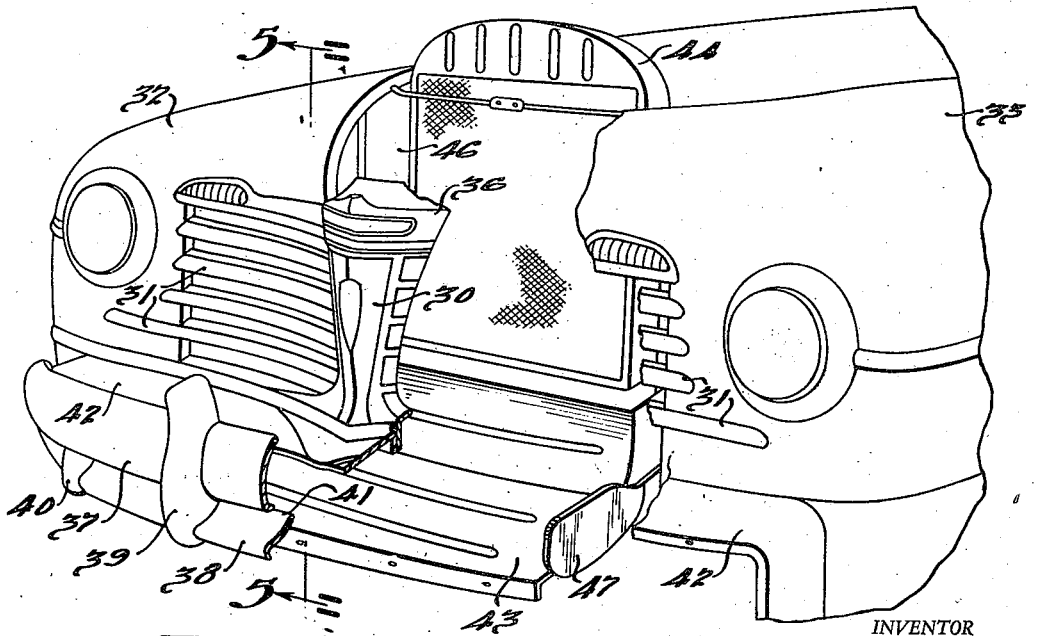

Fig. 2 is a similar view of a slightly modified construction.

Figure 1:
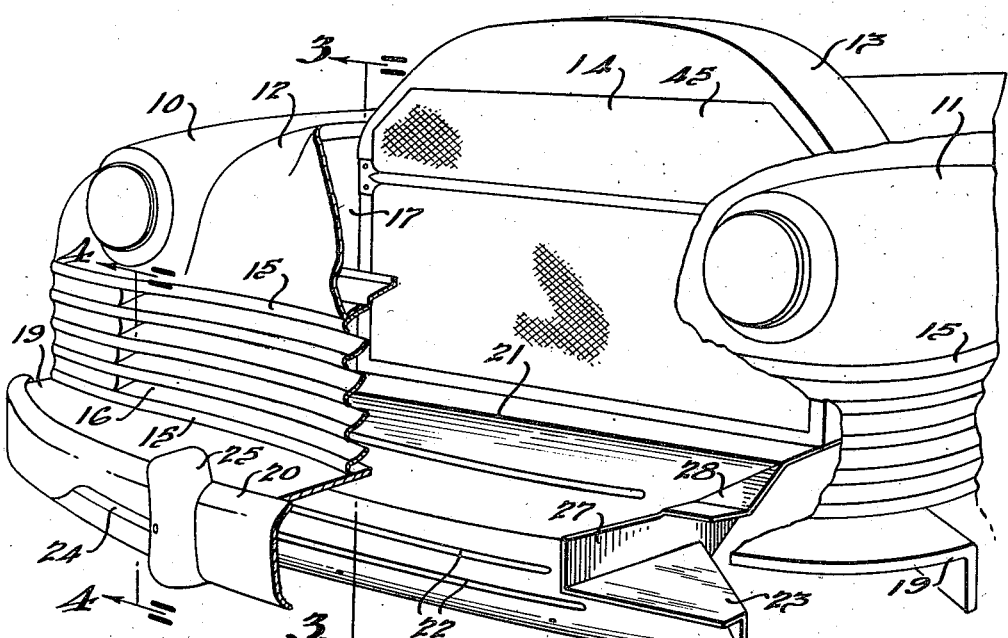

Figs. 3 and 4 are sectional views taken respectively as indicated by the lines 3—3 and 4—4 of Fig. 1.

Fig. 5 is a similar sectional view taken as indicated by the line 5—5 of Fig. 2.

Referring for the moment to Figs. 1, 3 and 4, it may be seen that the vehicle front end illustrated therein comprises front fenders 10 and 11 joined by a plurality of decorative grille elements 15 which are attached at their ends to the respective fenders and which extend across the front of the vehicle in vertically spaced relation.

A hood panel 12 of the "alligator" type is hinged at its rear portion for swinging in a vertical plane and has an in-turned flange 18 adapted to rest on the topmost grille element when in closed position. The top grille element has a flange for receiving the hood as illustrated in Figs. 3 and 4.

The vehicle radiator 13 is supported on the chassis (not shown) in conventional manner and is provided with a core 14 through which cooling air is adapted to flow. As aforesaid, the grille elements 15 are attached to the fenders 10 and spaced vertically to provide openings 16 through which air can pass. The openings 16 extend only between the fenders 10, 11, the space between the grille elements being closed by the fender panels at each end. The elements 15 are preferably chromium plated and are so shaped and arranged that the radiator core 14 cannot be seen from the front of the vehicle.

Each of the fenders is provided with an inner wall 17 which fits tightly against the side of the radiator 13. The lowermost grille element is welded to a horizontally disposed, laterally extending panel 19. The latter extends forwardly in cantilever fashion into close proximity to the impact bar 20 of the front bumper as best shown in Figs. 3 and 4. The impact bar 20 is of substantially U-shape in cross section and its top leg is curved rearwardly such that it covers the space between the bar and panel 19. The space between the bar and panel is sufficient to permit the impact bar to move slightly rearwardly in response to bumps without damaging the panel.

Secured to the bottom of the radiator and extending forwardly therefrom is a panel 21 formed with suitable stiffening beads 22. The panel 21 has a horizontally flanged portion 23 at each end which is disposed with respect to the bumper structure in such manner that it receives air admitted through openings 24 provided in the impact bar 20, one such opening being located outwardly beyond an upright guard member 25 of which there are two, the center portion of the impact bar between the guard members being solid.

The flanged portion 23 of the panel 21 directs the air inwardly toward the center of the vehicle as will be readily understood.

The panel 21 is slightly down-turned at its forward edge 26 so that air passing underneath the central portion of the bumper will be scooped upwardly and so that water, gravel, etc. which may enter the scoop will run out, the entire panel being pitched slightly downwardly toward its front marginal edge.

At each end above the portion 23, the panel 21 has an upturned flange 27, the rearward portion of which is provided with an outwardly directed flange 28. The regular bumper support arms are adapted to lie in the spaces between the flanges 23 and 28 and these extend rearwardly to the forward ends of the chassis side sills to which they are fastened. For the sake of clarity, these members have been omitted from the drawings, their presence being unnecessary to an understanding of the invention.

The panel 19 overlies the panel 21 and is secured to the flange 28 and the top marginal edge of the flange 27. Thus it may be seen that the panels 19 and 21 form an air directing scoop which collects air from beneath the impact bar 20 and from the openings 24 and directs it into the core 14 of the radiator 13. The hood panel 12 when closed closely engages the top of the radiator 13. It is thus apparent that the panel 21, the fender walls 17 and the hood 12 all cooperate to form a closed chamber through which the cooling air admitted through the grille openings 16 and through the opening between the panels 19 and 21 is directed into the openings of the radiator core 14.

This construction provides an extremely efficient cooling structure which provides an adequate supply of air to be delivered to the radiator and yet permits wide latitude for the designer, allowing him to achieve a front end of modern and pleasing appearance. By extending the nose portion of the hood panel 12 downwardly at the front and providing only a few grille openings disposed at a relatively low position, modern streamline appearance is obtained at some sacrifice in cooling efficiency. With the present invention, the desired aesthetic result may be obtained without impairment of cooling efficiency, the air scoop providing plenty of air to supplement that entering through the openings 16. The scoop structure itself is invisible from the front and sides of the vehicle except for the openings 24 which add a decorative note to the bumper.

Figs. 2 and 5 illustrate a modified form of the invention. In this modification, a central decorative nose member 30 is positioned at the front end of the vehicle and the grille elements 31 are relatively short, extending only from the nose member 30 to the fenders 32, 33, instead of across the entire front. The elements 31 are of stamped construction and are provided with decorative caps 34 which may be plated with bright metal.

The hood panel 35 includes a decorative nose piece 36 and is of the "alligator" type seating on the uppermost grille bar as shown in Fig. 5, this figure being taken along a section line disposed slightly to the left of the center piece 30.

The bumper structure comprises a pair of impact bars 37, 38 connected by uprights 39 and 40, the former serving also as a guard member. This construction provides an opening 41 extending between the uprights 40 which is considerably larger than the combined area of the openings 24 in Fig. 1. This larger opening delivers more air through the bumper and compensates for the inlet area lost by the provision of the center piece 30. The bumper is closed at each end beyond the members 40, the lower impact bar 38 being joined with the upper impact bar 37.

The air scoop is formed by a pair of vertically spaced panels 42 and 43 as in the Fig. 1 form, the panel 42 being carried by the lower grille and fender structure and the panel 43 being secured at its rear end between the chassis (not shown) and the radiator structure 44.

The air entering the interior of the front end structure through the grille and scoop is directed into the core 45 of the radiator by a passage formed by the hood panel 35, the panel 43 and the inner fender walls 46, a small side panel 47 being secured at each side of the panel 43 to confine the entering air to a definite path.

While some of the air entering through the scoop is taken in below the bumper, most of it enters through the opening 41, the lower impact bar 38 being suitably shaped in cross section to direct the air inwardly and upwardly toward the core 45.

The modification of Fig. 2 illustrates one of the many variations possible, it being obvious that many other changes in the proportions and arrangements of the parts may be made by those skilled in the art to provide a front end construction of pleasing and stylish appearance without impairing cooling efficiency.

I claim:

1. In a motor vehicle having a cooling radiator, a front end construction including a grille structure provided with openings for the entrance of cooling air for said radiator; an air scoop disposed below said grille structure and comprising a stamping secured at the bottom of said radiator and extending forwardly of said grille structure in vertically spaced relation relatively thereto, a second stamping secured to the bottom of said grille structure and extending forwardly thereof in parallelism with said first stamping and side wall portions uniting said stampings.

2. In a motor vehicle having a cooling radiator, a front end construction including a grille structure provided with openings for the entrance of cooling air for said radiator; an air scoop disposed below said grille structure and comprising a stamping secured at the bottom of said radiator and extending forwardly of said grille structure in vertically spaced relation relatively thereto, a second stamping secured to the bottom of said grille structure and extending forwardly thereof in parallelism with said first stamping and side wall portions uniting said stampings; and a bumper secured to said vehicle in front of said scoop having openings therein for admitting air to said scoop.

3. In a vehicle having an engine and a cooling radiator, a grille structure; an air scoop mounted at the front of said vehicle beneath said grille for delivering cooling air to said radiator, said scoop having a forwardly presenting intake opening and a tunnel portion including a continuous bottom wall extending rearwardly to the radiator and a top wall terminating rearwardly at said grille.

4. In a vehicle having an engine and a cooling radiator, a grille structure; an air scoop mounted at the front of said vehicle beneath said grille for delivering cooling air to said radiator, said scoop having a forwardly presenting intake opening and a tunnel portion including a bottom wall extending rearwardly to the radiator and a top wall terminating rearwardly at said grille; and a bumper mounted in front of said scoop for protecting and concealing the same, said bumper being provided with air admitting openings and arranged in spaced relation with respect to said scoop such that air can enter said scoop from beneath said bumper as well as through said openings.

5. In a vehicle front end construction, right and left fenders; a plurality of horizontally disposed bars extending between and secured to said fenders in vertically spaced relation to provide a decorative grille having air admitting openings therein; an air scoop mounted beneath said grille for admitting additional air to the interior of said front end and a bumper mounted in front of said scoop to conceal the scoop from view.

6. In a vehicle front end construction, a cooling radiator; a plurality of horizontally disposed bars extending across and in registering relationship with the front face of said radiator in vertically spaced relation thereby to provide a decorative grille having air admitting openings therein; an air scoop including top and bottom walls mounted beneath said grille for admitting additional air to the interior of said front end and to said radiator, and a bumper mounted in front of said scoop having an impact bar of substantially U-shaped cross section, the top wall of said scoop extending forwardly beneath the upper leg of the U and the bottom wall of said scoop extending forwardly toward said impact bar and terminating in a marginal edge spaced slightly rearwardly therefrom whereby the scoop is concealed from view.

7. In a vehicle front end construction having transversely spaced front fenders and a cooling radiator therebetween, a plurality of vertically spaced bars disposed forwardly of said radiator and secured at their ends to the respective fenders, the openings between said bars admitting air to the chamber thus formed in front of said radiator; and a forwardly extending auxiliary air admitting scoop disposed beneath said bars having a top wall thereof terminating rearwardly in the plane of said bars and a bottom wall thereof extending continuously rearwardly beneath said radiator.

ELMER G. ZEEB.